United States Patent
Baumgart (10) Patent No.: US 8,050,474 B2
(45) Date of Patent: Nov. 1, 2011

(54) SYSTEM FOR GENERATION OF A COMPOSITE MEDICAL IMAGE OF VESSEL STRUCTURE

(75) Inventor: John Baumgart, Hoffman Estates, IL (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 471 days.

(21) Appl. No.: 12/408,944

(22) Filed: Mar. 23, 2009

(65) Prior Publication Data
US 2009/0257631 A1   Oct. 15, 2009

Related U.S. Application Data

(60) Provisional application No. 61/044,114, filed on Apr. 11, 2008.

(51) Int. Cl.
*G06K 9/00* (2006.01)
(52) U.S. Cl. ........................................ 382/130
(58) Field of Classification Search .................. 382/130
See application file for complete search history.

(56) References Cited

U.S. PATENT DOCUMENTS

| | | | |
|---|---|---|---|
| 7,545,967 B1 * | 6/2009 | Prince et al. ................ | 382/130 |
| 2004/0153128 A1 | 8/2004 | Suresh et al. | |
| 2007/0014452 A1 | 1/2007 | Suresh et al. | |

OTHER PUBLICATIONS

Co-pending U.S. Appl. No. 12/403,017, filed Mar. 12, 2009, Baumgart et al.
Co-pending U.S. Appl. No. 12/370,252, filed Feb. 12, 2009, Baumgart.
Co-pending U.S. Appl. No. 12/266,961, filed Nov. 7, 2008, Baumgart.
Co-pending U.S. Appl. No. 11/554,082, filed Oct. 30, 2006, Baumgart.
Co-pending U.S. Appl. No. 11/779,491, filed Jul. 18, 2007, Baumgart.
Co-pending U.S. Appl. No. 12/350,395, filed Jan. 8, 2009, Baumgart et al.

* cited by examiner

*Primary Examiner* — Roy M Punnoose
(74) *Attorney, Agent, or Firm* — Alexander J Burke (57) ABSTRACT

A system reduces artifacts introduced by patient or table motion during generation of a composite image visualizing contrast agent flow. A system for generation of a composite medical image of vessel structure, includes an imaging device for acquiring multiple sequential images of vessel structure of a portion of patient anatomy in the presence of a contrast agent. An imaging processor aligns individual images of the multiple sequential images with a single particular mask image containing background detail of the portion of patient anatomy in the absence of contrast agent. The imaging processor forms data representing multiple digitally subtracted images by subtracting data representing the single particular mask image from aligned individual images of the multiple sequential images. The imaging processor associates different individual images of the multiple digitally subtracted images with different corresponding visual attributes and combines data representing the digitally subtracted images to form a composite image. A reproduction device presents the composite image to a user.

16 Claims, 5 Drawing Sheets

SYSTEM FOR GENERATION OF A COMPOSITE MEDICAL IMAGE OF VESSEL STRUCTURE

This is a non-provisional application of provisional application Ser. No. 61/044,114 filed Apr. 11, 2008, by J. Baumgart.

FIELD OF THE INVENTION

This invention concerns a system for generation of a composite medical image of vessel structure and contrast agent flow (representing blood flow) by allocating different visual attributes (e.g., different colors) to individual digitally subtracted images formed by subtracting background detail and by combining the individual digitally subtracted images to form a single composite image.

BACKGROUND OF THE INVENTION

In order to study contrast agent flow, which is representative of blood flow, through vessels in an angiography image sequence, it is useful to generate a static representation of flow using a color spectrum to represent the time at which contrast agent reached a certain state within vessels (e.g., first entered, reached a peak, no longer seen). For angiography, a typical color spectrum uses red to represent early blood flow and blue to represent late blood flow. In order to generate optimum results, individual images in an image sequence need to be in substantially perfect registration with a mask image frame showing background image detail. An image comprising a static representation of flow is generated as a composite representation of images acquired over a particular time period. Therefore, image related motion that occurs due to, slight patient movement or slight X-ray table motion, for example, causes undesired mis-registration artifacts to appear in a resulting blood flow representative composite image. A system according to invention principles addresses the identified deficiencies and associated problems.

SUMMARY OF THE INVENTION

A system reduces artifacts introduced by patient or table motion during generation of a composite image visualizing contrast agent flow over a subset of image frames acquired during an angiography imaging study that represent a specific time period within a period of imaging acquisition. A system for generation of a composite medical image of vessel structure, includes an imaging device for acquiring multiple sequential images of vessel structure of a portion of patient anatomy in the presence of a contrast agent. An imaging processor aligns individual images of the multiple sequential images with a single particular mask image containing background detail of the portion of patient anatomy in the absence of contrast agent. The imaging processor forms data representing multiple digitally subtracted images by subtracting data representing the single particular mask image from aligned individual images of the multiple sequential images. The imaging processor associates different individual images of the multiple digitally subtracted images with different corresponding visual attributes (e.g. colors, hues) and combines data representing the digitally subtracted images to form a composite image. A reproduction device presents the composite image to a user.

DETAILED DESCRIPTION OF THE INVENTION

A system reduces artifacts introduced by patient movement or motion of an X-ray unit patient support table during generation of an image visualizing contrast agent flow from a subset of digitally subtracted image frames comprising images acquired during an angiography imaging study. Individual images of multiple sequential images acquired during a specific time period within the duration of acquisition of the angiography imaging study are aligned with a single particular mask image that contains background detail of a portion of patient anatomy in the absence of contrast agent. The particular mask image is subtracted from the individual images of the multiple sequential images. Different individual images of the resultant multiple digitally subtracted images are associated with different corresponding visual attributes (e.g. colors, hues) and combined to form a composite image.

A processor as used herein is a device for executing stored machine-readable instructions for performing tasks and may comprise any one or combination of, hardware and firmware. A processor may also comprise memory storing machine-readable instructions executable for performing tasks. A processor acts upon information by manipulating, analyzing, modifying, converting or transmitting information for use by an executable procedure or an information device, and/or by routing the information to an output device. A processor may use or comprise the capabilities of a controller or microprocessor, for example. A processor may be electrically coupled with any other processor enabling interaction and/or communication there-between. A processor comprising executable instructions may be electrically coupled by being within stored executable instruction enabling interaction and/or communication with executable instructions comprising another processor. A user interface processor or generator is a known element comprising electronic circuitry or software or a combination of both for generating display images or portions thereof. A user interface comprises one or more display images enabling user interaction with a processor or other device.

An executable application comprises code or machine readable instructions for conditioning the processor to implement predetermined functions, such as those of an operating system, a context data acquisition system or other information processing system, for example, in response to user command or input. An executable procedure is a segment of code or machine readable instruction, sub-routine, or other distinct section of code or portion of an executable application for performing one or more particular processes. These processes may include receiving input data and/or parameters, performing operations on received input data and/or performing functions in response to received input parameters, and providing resulting output data and/or parameters. A user interface (UI), as used herein, comprises one or more display images, generated by a user interface processor and enabling user interaction with a processor or other device and associated data acquisition and processing functions.

The UI also includes an executable procedure or executable application. The executable procedure or executable application conditions the user interface processor to generate signals representing the UI display images. These signals are supplied to a display device which displays the image for viewing by the user. The executable procedure or executable application further receives signals from user input devices, such as a keyboard, mouse, light pen, touch screen or any other means allowing a user to provide data to a processor. The processor, under control of an executable procedure or executable application, manipulates the UI display images in response to signals received from the input devices. In this way, the user interacts with the display image using the input devices, enabling user interaction with the processor or other device. The functions and process steps herein may be performed automatically or wholly or partially in response to user command. An activity (including a step) performed automatically is performed in response to executable instruction or device operation without user direct initiation of the activity. An object or data object comprises a grouping of data, executable instructions or a combination of both or an executable procedure.

Figure 1:
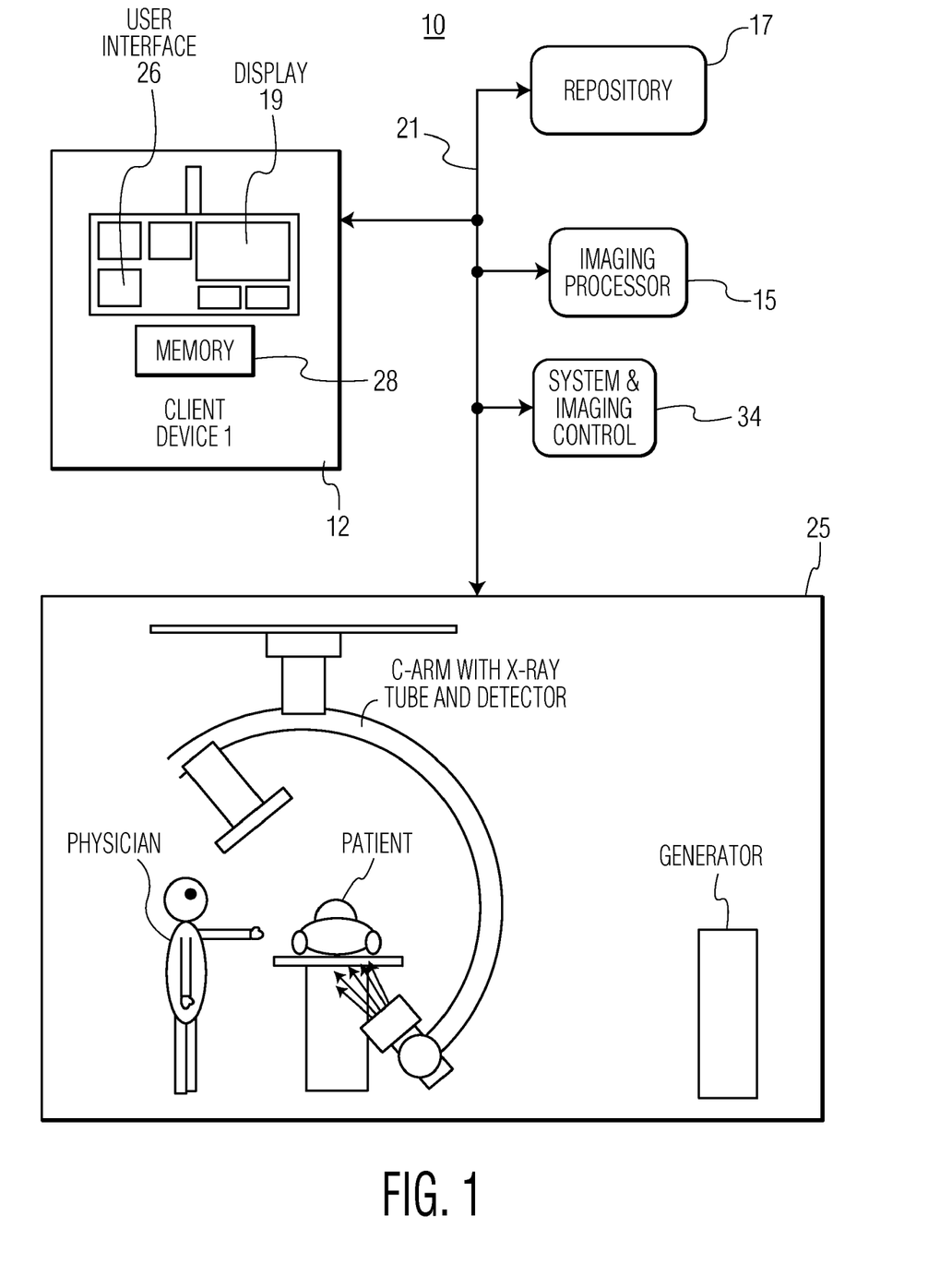
FIG. 1 shows a system for generation of a composite medical image of vessel structure, according to invention principles.

FIG. 1 shows system 10 for generation of a composite medical image of vessel structure. System 10 includes one or more processing devices (e.g., workstations, computers or portable devices such as notebooks, Personal Digital Assistants, phones) 12 that individually include memory 28, user interface 26 enabling user interaction with a Graphical User Interface (GUI) and display 19 supporting GUI and image presentation in response to predetermined user (e.g., physician) specific preferences. As well as device 12, system 10 also includes at least one repository 17, and imaging device 25, imaging processor 15 and system and imaging controller 34 intercommunicating via network 21. Display 19 of processing device 12 presents display images comprising a GUI. At least one repository 17 stores medical image studies for patients in DICOM compatible (or other) data format. A medical image study individually includes multiple image series of a patient anatomical portion which in turn individually include multiple images.

Imaging device 25 acquires multiple sequential images of vessel structure of a portion of patient anatomy in the presence of a contrast agent. Imaging processor 15 aligns individual images of the multiple sequential images with a single particular mask image containing background detail of the portion of patient anatomy in the absence of contrast agent and forms data representing multiple digitally subtracted images by subtracting data representing the single particular mask image from aligned individual images of the multiple sequential images. Imaging processor 15 associates different individual images of the multiple digitally subtracted images with different corresponding visual attributes and combines data representing the digitally subtracted images to form a composite image. A reproduction device (e.g., display 19 or a printer) presents the composite image to a user. Imaging controller 34 controls operation of imaging device 25 in response to user commands entered via user interface 26.

Figure 2:
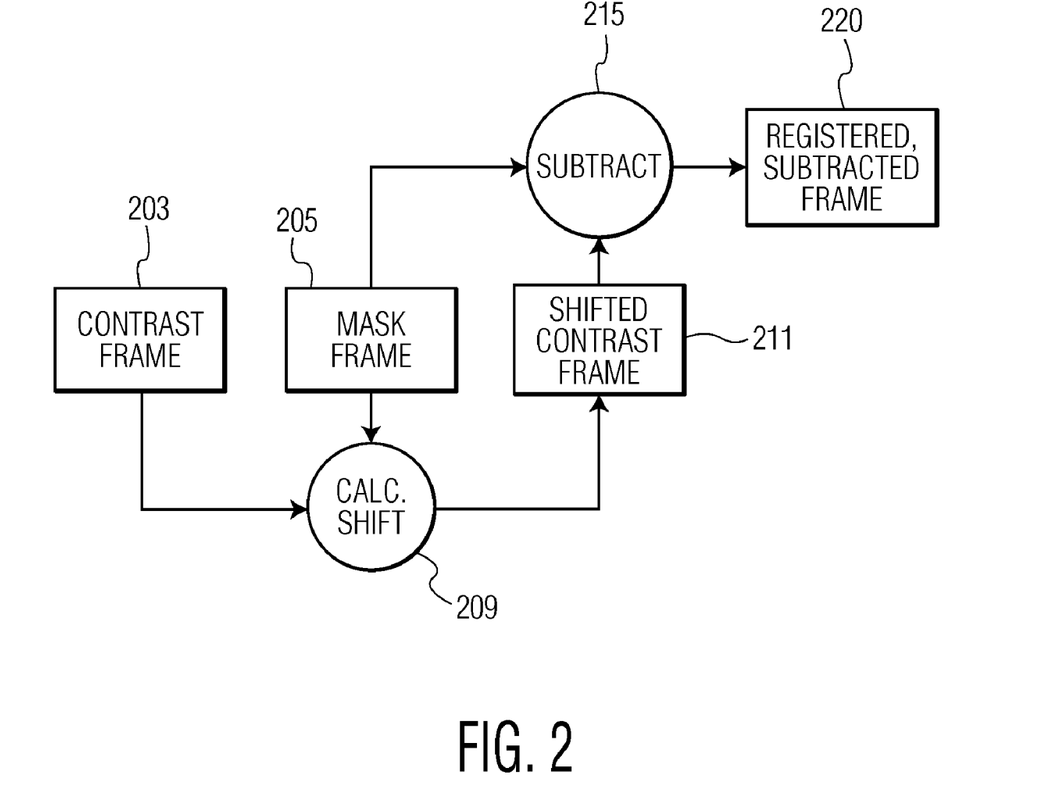
FIG. 2 shows a system for determination of a properly registered subtracted image frame, according to invention principles.

FIG. 2 shows a system for determination of a properly aligned (registered) subtracted image frame by subtracting data representing a single particular mask image from aligned individual images of multiple sequential images. A mask image containing background detail of a portion of patient anatomy acquired in the absence of contrast agent is automatically selected by imaging processor 15 in step 205 from multiple sequential images of vessel structure of a portion of patient anatomy previously acquired in the presence of a contrast agent in step 203. Imaging processor 15 automatically selects a mask image from the multiple sequential images in response to detection of an X-ray dose having reached equilibrium as indicated by an X-ray emission unit voltage reaching stability and being within a predetermined voltage range. In another embodiment a user manually selects a specific image to be used as the mask image. The multiple sequential images of the vessel structure acquired in step 203 are registered (aligned) with the selected mask image in order to eliminate motion both between each individual image of the multiple sequential images and the mask image as well as between individual images of the multiple sequential images.

A region of interest of the multiple sequential images is selected either automatically or by a user. In step 211 imaging processor 15 aligns the region of interest in the individual images of the multiple sequential images (or the whole individual image) with the mask image using a translational shift vector determined in step 209. Imaging processor 15 determines a translational shift vector using a known deterministic sign change similarity measure. A deterministic sign change similarity measure is employed in a known method for determining how well two images are aligned with each other. In order to minimize motion artifacts, individual images from which a mask image is subtracted are transformed by processor 15 to align with the mask image prior to subtraction. Processor 15 in one embodiment calculates a shift vector comprising a simple, rigid translational shift that is applied to the entire image. In another embodiment, processor 15 employs a more complex flexible method of image alignment of an image acquired in the presence of a contrast agent with a mask image to produce a derived contrast image.

Imaging processor 15 uses a determined translation vector indicated by the similarity measure to translate individual images of the multiple sequential images to align with and match the selected mask frame. Imaging processor 15 in step 215 subtracts data representing the selected mask image from data representing translated individual images of the multiple sequential images to provide images of vessel structure in the presence of contrast media excluding background image detail. Imaging processor 15 performs the subtraction in step 215 with saturation between a translated individual image of the multiple sequential images and a mask image, so subtraction results that indicate negative amounts of contrast agent are set to indicate zero contrast agent. In order to suppress low-level noise, imaging processor 15 applies a threshold in the image data subtraction of step 215 so that subtracted luminance representative image data below a predetermined threshold value is set to zero. Imaging processor 15 provides resultant registered, subtracted images in step 220 following the subtraction in step 215.

This process of FIG. 2 is iteratively repeated for a predetermined set of multiple individual images of the multiple sequential images that are to be used in the composition of a composite color image. The predetermined set of multiple individual images used includes one or more images acquired after a selected mask image. In one embodiment, the particular images of the predetermined set are determined by data indicating, the number of images that are in the multiple sequential images acquired after a mask image, a configured limit identifying the number of images that are to be used in generating a composite color image and start and end times of a time period encompassing the images of the composite color image. In response to generation of the resultant registered, subtracted images in step 220, a composite color image is generated either from the acquired images or from a subset acquired during a specific time period. Imaging processor 15 determines a peak luminance intensity value of individual image pixels, as well as time of occurrence of corresponding peak values (e.g., relative to start of the subset of images used in generating a composite image) and uses the peak values and times to determine the color of the respective individual image pixels of the output composite color image. Imaging processor 15 uses acquisition times (relative to start of acquisition of images used in generating a composite image) of individual pixels (or whole images) to determine position on a color spectrum and pixel hue, using a hue-saturation-value (or HSV) colorspace. Imaging processor 15 uses the peak luminance intensity value of individual pixels to determine luminance intensity (luminance value in HSV colorspace) of respective individual image pixels of the output composite color image.

Figure 3:
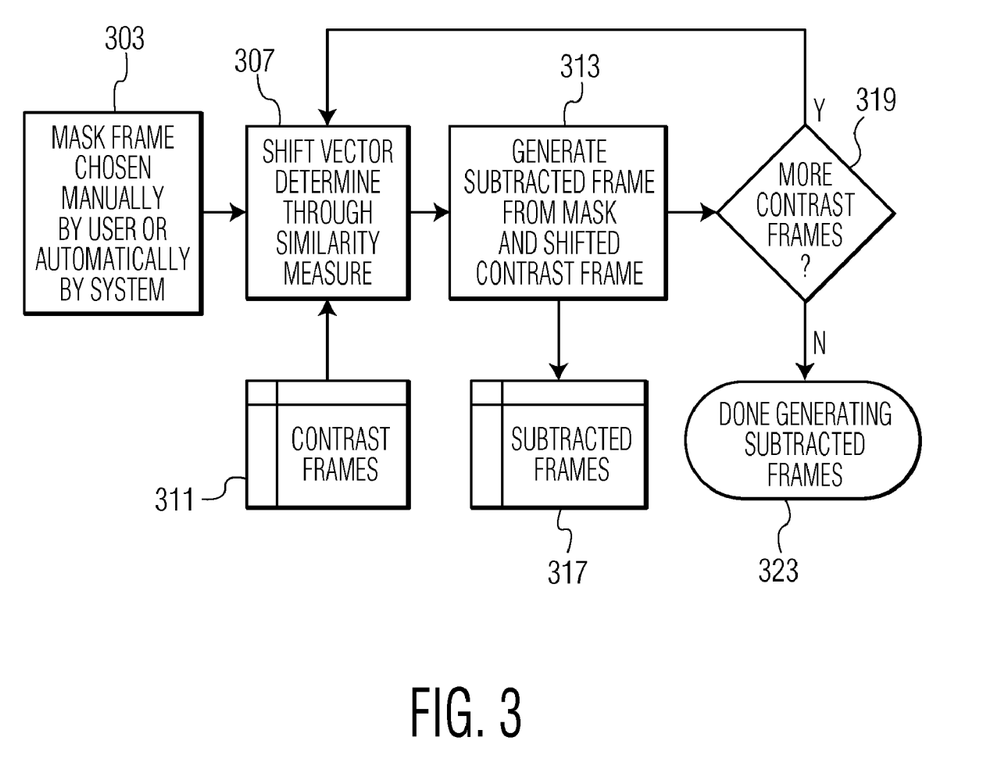
FIG. 3 shows a system for generation of properly registered subtracted image frames, according to invention principles.

FIG. 3 shows a system for generation of properly registered subtracted images. In step 303 imaging processor 15 automatically selects a mask image from multiple sequential images of vessel structure as previously explained in connection with FIG. 2. Alternatively the mask image may be selected manually by a user. In step 307 imaging processor 15 determines a translational shift vector to apply to the multiple sequential images acquired in the presence of a contrast agent in step 311. Processor 15 determines a translational shift vector using a known deterministic sign change similarity measure and applies the shift vector to align individual images of the multiple sequential images with the mask image prior to subtraction. In step 313 imaging processor 15 subtracts data representing the mask image from data representing the aligned individual images to provide digitally subtracted images 317. The process of steps 307 and 313 is repeated as directed in step 319 until individual digitally subtracted images 317 corresponding to the acquired multiple sequential images 311 used to provide a composite color image are provided in step 323.

Figure 4:
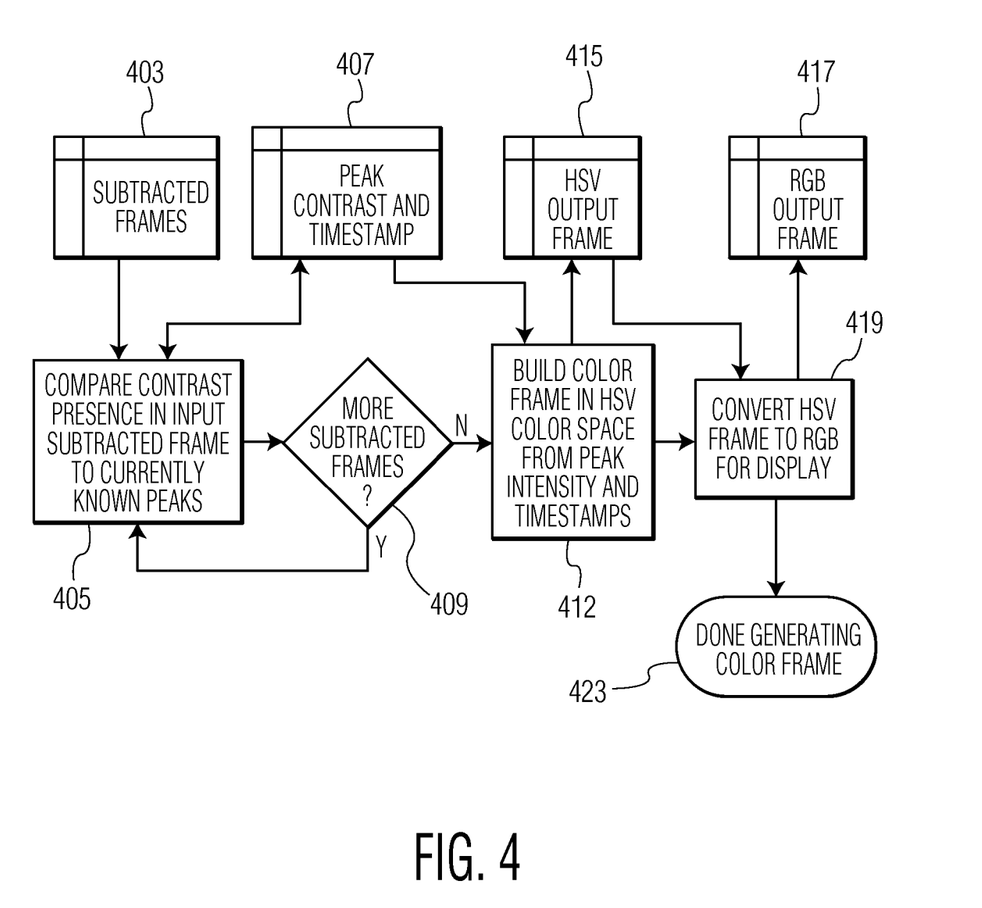
FIG. 4 shows a process for generation of a color output composite image frame for display, according to invention principles.

FIG. 4 shows a process for generation of a color output composite image for output for display from a selected set of digitally subtracted images 403 (e.g., corresponding to images 317 provided in FIG. 3. In step 405 imaging processor 15 determines peak luminance intensity value of individual image pixels in an individual image of digitally subtracted images 403. Imaging processor 15 also determines time of occurrence of corresponding peak luminance intensity values (e.g., relative to start of the subset of images used in generating a composite color image) and stores the peak values and times in step 407 for use in determining the color of the respective individual image pixels of the output composite color image. Imaging processor performs steps 405 and 407 iteratively as directed in step 409 until the individual pixels of the set of images 403 are processed to determine and store peak luminance intensity values and times in step 407. Imaging processor 15 uses acquisition times (relative to start of acquisition of images employed in generating a composite image) of individual pixels (or whole images) to determine position on a color spectrum and pixel hue, using a hue-saturation-value (or HSV) colorspace. Imaging processor 15 uses the peak luminance intensity value of individual pixels to determine luminance intensity (luminance value in HSV colorspace) of respective individual image pixels of the output composite color image.

Imaging processor 15 generates two image frame datasets and stores the datasets in step 407. Processor 15 generates and stores a first image frame dataset (C) containing a frame of maximum pixel luminance intensity values (acquired in the presence of a contrast agent) for individual pixels of individual images of image set 403. Processor 15 generates and stores a second image frame dataset (T) containing acquisition time timestamps of individual pixels of individual images of image set 403 (relative to start of acquisition of image set 403) that contained the peak contrast value at that location. Imaging processor 15 in step 412, processes a selected set of digitally subtracted images 403 and the generated additional datasets C and T to provide a hue-saturation-value (HSV) composite color image 415 for output using the following functions.

| Hue (H) | $H(x, y) = H_0 + \dfrac{(H_f - H_0) \cdot T(x, y)}{T_f - T_0}$ |
|---|---|
| Value (V) | $V(x, y) = \begin{cases} \dfrac{C(x, y) - C_{min}}{C_{max} - C_{min}}, & T_0 \le T(x, y) < T_f \\ 0, & \text{otherwise} \end{cases}$ |
| Saturation (S) | $S(x, y) = 1$ |

Where $H_0$ and $H_f$ represent starting and ending hues to be used in the output composite color image, typically red and blue, respectively. $T_0$ and $T_f$ represent starting and ending timestamps of images of image set 403 used in generation of composite color image 415. $C_{min}$ and $C_{max}$ represent the minimum and maximum luminance intensity values in composite color image 415. Saturated luminance intensity value (e.g., a maximum value) is equal to one in this embodiment. Composite color image 415 is converted in step 419 to an RGB image 417 compatible with a display and the process of FIG. 4 terminates at step 423.

Figure 5:
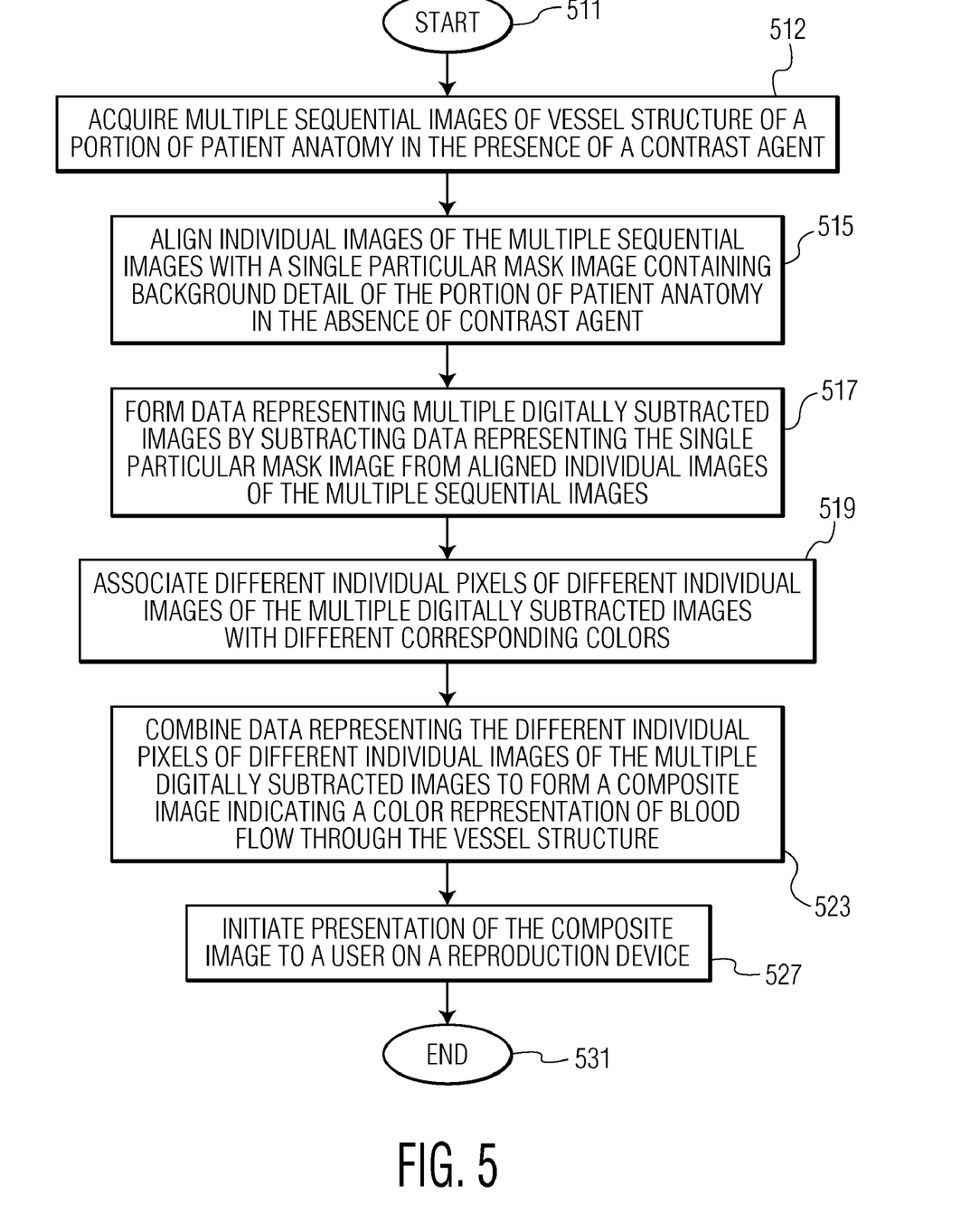
FIG. 5 shows a flowchart of a process used by a system for generation of a composite medical image of vessel structure, according to invention principles.

FIG. 5 shows a flowchart of a process used by system 10 (FIG. 1) for generation of a composite color image of vessel structure. In step 512 following the start at step 511 imaging device 25 acquires multiple sequential images of vessel structure of a portion of patient anatomy in the presence of a contrast agent. The multiple sequential images are associated with a time window of imaging acquisition determined in response to predetermined information and the number of the multiple sequential images is determined in response to predetermined information. The time window and number information are determined by user data entry via a display image presented on display 19. In step 515 imaging processor 15 aligns individual images of the multiple sequential images with a single particular mask image containing background detail of the portion of patient anatomy in the absence of contrast agent using a translational shift vector. Imaging processor 15 in step 517 forms data representing multiple digitally subtracted images by subtracting data representing the single particular mask image from aligned individual images of the multiple sequential images.

Further, imaging processor 15 in step 519 associates different individual pixels of different individual images (or different whole individual images) of the multiple digitally subtracted images with different corresponding colors (or other visual attributes such as different hues or shades), in response to relative time of acquisition of the different individual images. In step 523 imaging processor 15 combines data representing the different individual pixels of different individual images (or in other embodiments representing other portions of the different individual images) of the multiple digitally subtracted images to form a composite image indicating a color (or shaded) representation of blood flow through the vessel structure. Imaging processor 15 combines data representing the digitally subtracted images to form a composite image by using image (and/or individual pixel) acquisition times relative to start of acquisition of images employed in generating the composite image and by using peak luminance intensity value of individual pixels to determine luminance intensity of respective individual image pixels of the composite image. Specifically, in one embodiment imaging processor 15 combines data representing the digitally subtracted images to form a composite image using functions described in connection with FIG. 4 A reproduction device (such as display 19) presents the composite image to a user in step 527 and the process terminates at step 531.

The system and processes of FIGS. 1-5 are not exclusive. Other systems, processes and menus may be derived in accordance with the principles of the invention to accomplish the same objectives. Although this invention has been described with reference to particular embodiments, it is to be understood that the embodiments and variations shown and described herein are for illustration purposes only. Modifications to the current design may be implemented by those skilled in the art, without departing from the scope of the invention. The system mask alignment reduces artifacts introduced by patient or table motion during generation of a composite image visualizing contrast agent flow over a subset of image frames acquired during an angiography imaging study that represent a specific time period within a period of imaging acquisition. Further, the processes and applications may, in alternative embodiments, be located on one or more (e.g., distributed) processing devices. Any of the functions and steps provided in FIGS. 1-5 may be implemented in hardware, software or a combination of both.

What is claimed is:

1. A system for generation of a composite medical image of vessel structure, comprising:
    an imaging device for acquiring a plurality of sequential images of vessel structure of a portion of patient anatomy in the presence of a contrast agent;
    an imaging processor for,
        aligning individual images of said plurality of sequential images with a single particular mask image containing background detail of said portion of patient anatomy in the absence of contrast agent,
        forming data representing a plurality of digitally subtracted images by subtracting data representing said single particular mask image from aligned individual images of said plurality of sequential images,
        associating different individual images of said plurality of digitally subtracted images with different corresponding visual attributes and
        combining data representing said digitally subtracted images to form a composite image; and
    a reproduction device for presenting said composite image to a user.

2. A system according to claim 1, wherein
said visual attributes are different colors and
said composite image indicates a color representation of blood flow through said vessel structure.

3. A system according to claim 1, wherein
said visual attributes are different hues and
said composite image indicates a color representation of blood flow through said vessel structure.

4. A system according to claim 1, wherein
said visual attributes are different shades and
said composite image indicates a shaded representation of blood flow through said vessel structure.

5. A system according to claim 1, wherein
said imaging processor associates different individual images of said plurality of digitally subtracted images with different corresponding visual attributes in response to relative time of acquisition of said different individual images.

6. A system according to claim 1, wherein
said plurality of sequential images are associated with a time window of imaging acquisition determined in response to predetermined information.

7. A system according to claim 1, wherein
the number of said plurality of sequential images is determined in response to predetermined information.

8. A system according to claim 1, wherein
said imaging processor aligns said individual images of said plurality of sequential images with said single particular mask image using a translational shift vector.

9. A system according to claim 1, wherein
said imaging processor combines data representing said digitally subtracted images to form a composite image by using acquisition times relative to start of acquisition of images employed in generating said composite image.

10. A system according to claim 9, wherein
said imaging processor combines data representing said digitally subtracted images to form a composite image by using peak luminance intensity value of individual pixels to determine luminance intensity of respective individual image pixels of said composite image.

11. A system according to claim 1, wherein
said imaging processor combines data representing said digitally subtracted images to form a composite image by using peak luminance intensity value of individual pixels to determine luminance intensity of respective individual image pixels of said composite image.

12. A system according to claim 1, wherein
said imaging processor combines data representing said digitally subtracted images to form a composite image using functions, by determining a hue value $$H(x, y) = H_0 + \frac{(H_f - H_0) \cdot T(x, y)}{T_f - T_0}$$

and
by determining luminance intensity value $$V(x, y) = \begin{cases} \dfrac{C(x, y) - C_{min}}{C_{max} - C_{min}}, & T_0 \leq T(x, y) < T_f \\ 0, & \text{otherwise} \end{cases}$$

where $H_0$ and $H_f$ represent starting and ending hues to be used in the output composite color image, $T_0$ and $T_f$ represent starting and ending timestamps of images of said digitally subtracted images used in generation of said composite image, $C_{min}$ and $C_{max}$ represent the minimum and maximum luminance intensity values in said composite image.

13. A system according to claim 1, wherein
said imaging processor associates different individual pixels of said different individual images of said plurality of digitally subtracted images with different corresponding visual attributes and combines data representing said individual pixels of said digitally subtracted images to form said composite image.

14. A method for generation of a composite medical image of vessel structure, comprising the activities of:

acquiring a plurality of sequential images of vessel structure of a portion of patient anatomy in the presence of a contrast agent;

aligning individual images of said plurality of sequential images with a single particular mask image containing background detail of said portion of patient anatomy in the absence of contrast agent;

forming data representing a plurality of digitally subtracted images by subtracting data representing said single particular mask image from aligned individual images of said plurality of sequential images;

associating different individual images of said plurality of digitally subtracted images with different corresponding colors;

combining data representing said digitally subtracted images to form a composite image indicating a color representation of blood flow through said vessel structure; and presenting said composite image to a user.

15. A method according to claim 14, wherein said activity of associating different individual images of said plurality of digitally subtracted images with different corresponding colors comprises associating different individual pixels of said different individual images of said plurality of digitally subtracted images with different corresponding colors and said activity of combining data representing said digitally subtracted images comprises combining data representing individual pixels of said digitally subtracted images to form said composite image.

16. A system for generation of a composite medical image of vessel structure, comprising:

an imaging device for acquiring a plurality of sequential images of vessel structure of a portion of patient anatomy in the presence of a contrast agent;

an imaging processor for, aligning individual images of said plurality of sequential images with a single particular mask image containing background detail of said portion of patient anatomy in the absence of contrast agent, forming data representing a plurality of digitally subtracted images by subtracting data representing said single particular mask image from aligned individual images of said plurality of sequential images, associating different individual pixels of different individual images of said plurality of digitally subtracted images with different corresponding colors and combining data representing said different individual pixels of different individual images of said plurality of digitally subtracted images to form a composite image indicating a color representation of blood flow through said vessel structure; and a reproduction device for presenting said composite image to a user.

* * * * *